United States Patent Office 3,123,382
Patented Mar. 3, 1964

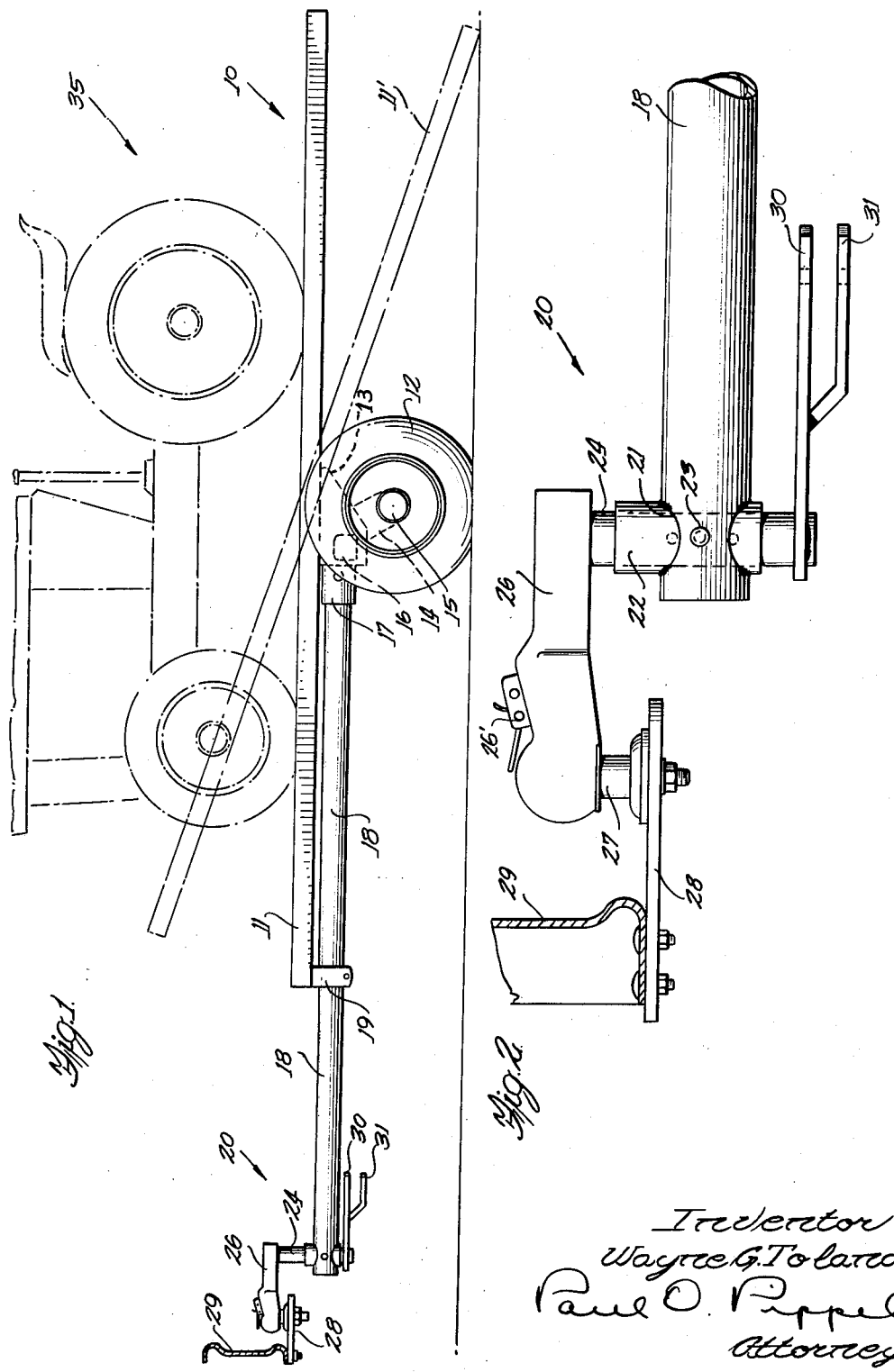

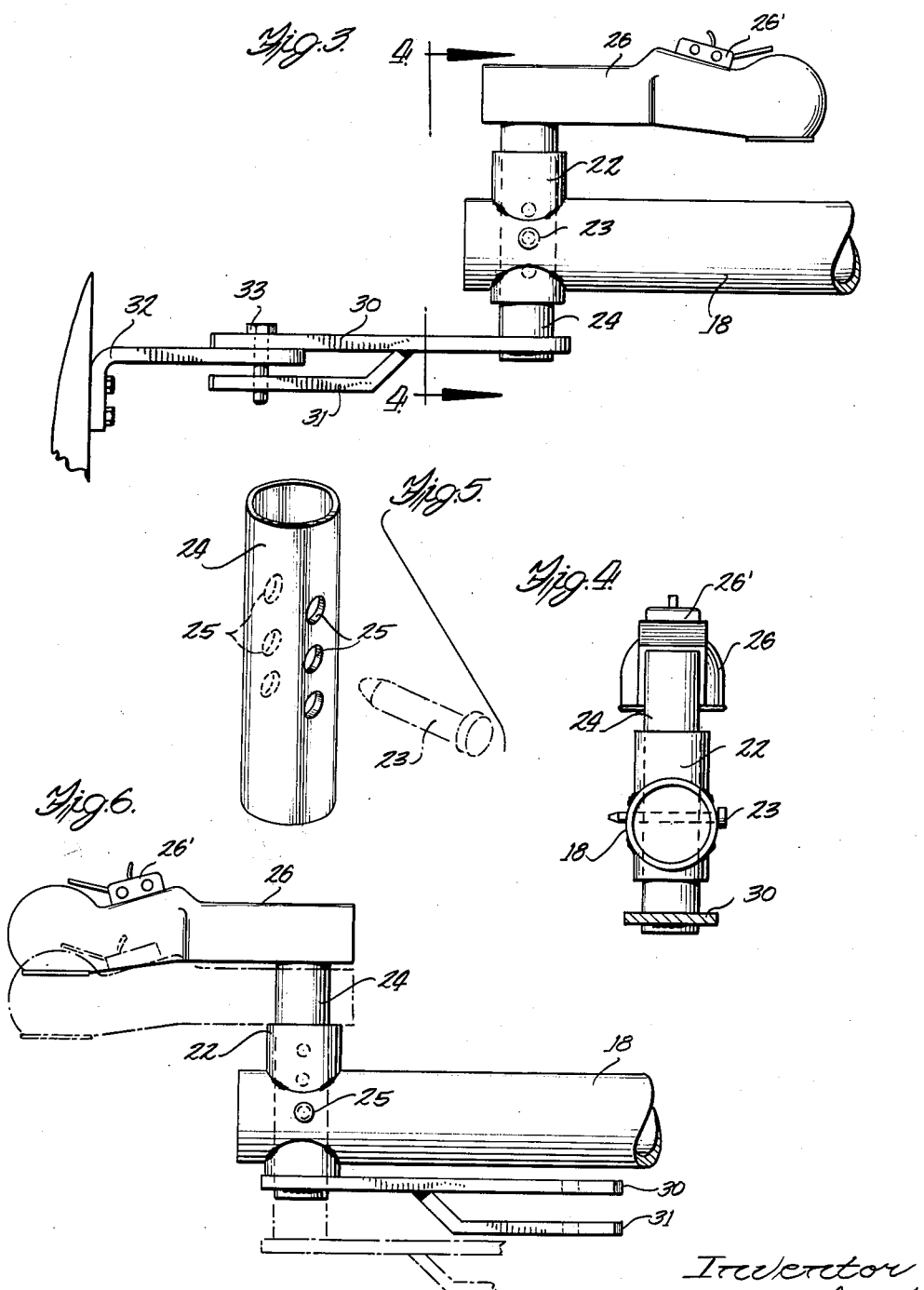

3,123,382
SELECTIVELY REVERSIBLE AND VERTICALLY ADJUSTABLE HITCH STRUCTURE
Wayne G. Toland, Stockton, Calif., assignor to International Harvester Company, Chicago, Ill., a corporation of New Jersey
Filed June 7, 1962, Ser. No. 200,868
3 Claims. (Cl. 280—417)

This invention relates in general to trailers, and more particularly to a new and improved hitching means for securing a trailer to a source of motive power.

In the past few years, small garden-size tractors have become increasingly popular. Because of the limited speeds available in such tractors, it has been impractical and dangerous to drive the tractor on an open highway. It has, therefore, been the practice to mount the garden-size tractor on a trailer, which is secured to an automobile, truck, tractor, or other source of motive power when it is desired to transport the garden-size tractor over a substantial distance. Since such trailers also have advantageous utility when used in conjunction with the garden-size tractor, it is a principal object of the present invention to provide a hitch structure which will render the trailer capable of being secured to a garden-size tractor as well as to many other different types of vehicles.

An object of the present invention is to provide a trailer with a reversible hitch structure having a pair of selectively usable connecting means thereon.

Another object of the invention is to provide a trailer with a vertically adjustable hitch structure so that the line of pull can be aligned with the center of resistance of the trailer.

A further object of the invention is to provide a trailer with a hitch structure having the advantages set forth above, and which has a sturdy, yet simple, design that is relatively inexpensive to manufacture.

Other objects and advantages of the invention will hereinafter become more fully apparent from an examination of the following disclosure and annexed drawings, wherein:

FIGURE 1 is a side elevational view of the trailer having a garden-size tractor mounted thereon;

FIGURE 2 is a side elevational view on an enlarged scale of the hitch structure illustrated in FIGURE 1;

FIGURE 3 is a side elevational view similar to FIGURE 2 showing the hitch components in a reversed position;

FIGURE 4 is a sectional view taken along the line 4—4 of FIGURE 3;

FIGURE 5 is a perspective detail view of one element of the hitch structure; and FIGURE 6 is a side elevational view similar to FIGURE 2 showing the vertically adjustable feature of the present invention.

Referring now to the drawings, wherein like reference characters designate like or corresponding parts throughout the several views, the trailer which is the subject matter of the present invention is indicated generally by reference numeral 10 in FIGURE 1. Trailer 10 includes a bed 11 which is tiltably mounted about the axis of wheels 12, 12 (only one of which is shown) by having brackets 13 (only one of which is shown) mounted on each side of bed 11 and depending arms 14 secured to the hubs 15 of wheels 12. A transversely extending crossmember 16 is secured to brackets 13, and is provided with a sleeve 17 which is adapted to receive one end of longitudinally extending beam member 18. The forward end of trailer 10 is also provided with a pair of depending brackets 19 which support beam 18 adjacent the central portion thereof.

The forwardly extending end of beam 18 is provided with the novel hitch means of the present invention which are indicated generally by reference numeral 20. Referring now to FIGURE 2, it will be noted that the forwardly extending end of beam 18 is provided with an opening 21 extending vertically therethrough. Fixedly secured in opening 21, as by welding or the like, is a hollow cylindrically shaped sleeve member 22.

Sleeve 22 is provided with a pair of vertically aligned holes, which are adapted to slidably receive pin 23, the purpose of which will hereinafter become more fully apparent.

A cylindrically-shaped upright or standard 24 is slidably mounted within sleeve 22. As is best seen in FIGURE 5, standard 24 is provided with a plurality of pairs of vertically spaced transversely aligned holes 25 adapted to selectively receive pin 23 to provide a range of vertical adjustments for standard 24. As can be readily understood, when pin 23 is removed, standard 24 is capable of not only vertical movement within sleeve 22, but is also capable of pivoting freely therewithin.

A first connecting means is fixedly secured to the upper end of standard 24 and in the illustrated embodiment is the socket 26 of a conventional ball-and-socket connection. This device may be of any preferred construction and includes a latch element 26' by means of which the ball-and-socket joint is firmly held together for the towing operation. The ball of the ball-and-socket connection is mounted on an upright 27 that is carried by an arm 28, which is in turn mounted to the towing vehicle, such as the bumper 29 of a conventional automobile, as is well known in the art.

A second connecting means is provided adjacent the lower end of upright 24, and is of the clevis type having a pair of spaced-apart apertured ears 30 and 31. The clevis connection is adapted to be used with the apertured lug member 32 usually found on conventional garden-size tractors. Lug 32 is held between arms 30 and 31 by means of a pin 33 or the like.

When it is desired to transport the garden-size tractor indicated generally by reference numeral 35, trailer bed 10 is tilted to the broken line position indicated by reference numeral 11'. The tractor is then driven upon the trailer and assumes the position shown in FIGURE 1. Hitching means 20 are then actuated to secure the trailer to the source of motive power. When using the conventional ball-and-socket connecting means found on automobile or truck bumpers, pin 23 is removed from the end of beam 18, and socket member 26 is pivoted into the positions shown in FIGURE 1 and FIGURE 6, where it extends outwardly from beam 18. Socket 26 is then adjusted to the proper ball-engaging height by sliding upright 24 in sleeve 22. When the proper height has been determined, pin 23 is inserted into the proper pair of holes 25 to lock upright 24 against vertical or pivotal movement. Latch 26' is then actuated to firmly secure the trailer to the towing vehicle. When it is desired to remove tractor 35 from the trailer, latch 26' is disengaged, and the tractor 35 is moved rearwardly to cause trailer bed 11 to pivot into the position illustrated at 11' in FIGURE 1.

Once the tractor has been removed and it is desired to utilize it as a towing means for the trailer, pin 23 is removed from the end of beam 18 and the clevis connection means is pivoted into the position illustrated in FIGURE 3. Upright 24 is then lowered within sleeve 22 so that arms 30 and 31 will be properly aligned with lug 32, and pin 23 is then reengaged with the proper pair of holes 25 to lock upright 24 in this position. Pin 33 is then disposed through the apertures in arms 31 and 30, and through the aperture in lug 32 to complete the hitching of the trailer to tractor 35.

From the foregoing, it should be apparent that what has been provided is a novel compact reversible hitch structure which is of relatively simple design, yet which functions effectively to enable the trailer to be connected to a towing vehicle having various kinds of hitching structures disposed at different elevations with respect to the trailer. Various modifications are contemplated and may obviously be resorted to by those skilled in the art without departing from the spirit and scope of the invention as set forth in the appended claims.

What is claimed is:

1. Adjustable hitch means adapted to connect the draft member of a towed vehicle to the corresponding draft members of selected propelling vehicles having draft members of different height comprising: generally vertical sleeve means carried by one of said draft members, an upright vertically adjustable in said sleeve means and rotatable about its axis therein, a first hitch member affixed to one end of said upright and projecting radially therefrom in one direction to an operative position in connecting relation to the other of said draft members, a second hitch member affixed to the other end of said upright at a location vertically spaced from said first hitch member and projecting radially from the upright to an inoperative position in the opposite direction, said upright being rotatable in said sleeve means to optionally dispose said second hitch member in connecting relation to said other of said draft members, and cooperating locking means carried by said sleeve means and said upright effective to hold the upright in selected vertical positions relative to the sleeve means.

2. The invention set forth in claim 1, wherein said one of said draft members extends longitudinally perpendicular to said sleeve means and parallel to and in vertical alignment with said second hitch member in the inoperative position thereof.

3. The invention set forth in claim 1, wherein an opening is provided in said sleeve means and a plurality of vertically spaced openings are provided in said upright selectively registrable with the opening in the sleeve means and a pin is insertable in said registering openings to hold the upright in a selected vertical position.

References Cited in the file of this patent

UNITED STATES PATENTS

| | | |
|---|---|---|
| 2,142,365 | McKee | Jan. 3, 1939 |
| 2,827,307 | Osborn | Mar. 18, 1958 |
| 2,872,213 | Hosford | Feb. 3, 1959 |
| 2,940,775 | Farrow et al. | June 14, 1960 |
| 3,035,856 | Mleczko et al. | May 22, 1962 |
| 3,066,952 | Price | Dec. 4, 1962 |